United States Patent
Parry et al.

[15] 3,635,843
[45] Jan. 18, 1972

[54] CRYSTALLINE 1,5-DIGLYCIDYLNAPHTHALENE AND CURED PRODUCTS THEREOF

[72] Inventors: Harvey L. Parry, Summit; Alton J. Landua, Maplewood, both of N.J.

[73] Assignee: Shell Oil Company, New York, N.Y.

[22] Filed: July 17, 1969

[21] Appl. No.: 842,526

[52] U.S. Cl.....................260/2 N, 117/127, 117/161 ZB, 161/186, 260/2 EC, 260/2 A, 260/78.4 EP
[51] Int. Cl........................................................C08g 23/20
[58] Field of Search..........260/348, 2 EP, 2 A, 2 EC, 78.4 EP

[56] References Cited

UNITED STATES PATENTS 2,938,875   5/1960   Martin et al. .......................260/348 X Primary Examiner—William H. Short
Assistant Examiner—T. Pertilla
Attorney—Joseph W. Brown and Norris E. Faringer

[57] ABSTRACT

The preparation of crystalline 1,5-diglycidylnaphthalene is described. The present invention is further directed to curable and cured compositions of 1,5-diglycidylnaphthalene.

8 Claims, 3 Drawing Figures

THERMAL STABILITY OF EPOXY RESIN CASTINGS

THERMAL STABILITY OF EPOXY RESIN CASTINGS

EFFECT OF 500°F EXPOSURE ON DAMPING VS. TEST TEMPERATURE FOR 1,5-DGN/m-PHENYLENEDIAMINE CASTINGS

EFFECT OF 500°F EXPOSURE ON ELASTIC MODULUS VS TEST TEMPERATURE FOR 1,5-DGN/m-PHENYLENEDIAMINE CASTINGS

INVENTORS:
HARVEY L. PARRY
ALTON J. LANDUA
BY: *Norris E. Foringer*
THEIR ATTORNEY

CRYSTALLINE 1,5-DIGLYCIDYLNAPHTHALENE AND CURED PRODUCTS THEREOF

BACKGROUND OF THE INVENTION

The preparation of polysubstituted aromatic compounds such as the poly (vic-epoxyalkyl) benzenes, e.g., 1,4-bis (2,3-epoxypropyl) benzene is known. It is also known to epoxidize ethylenically unsaturated aromatic hydrocarbons such as the diallyl naphthalenes to form the glycidyl derivatives thereof. See, for example, U.S. Pat. No. 2,938,875. The preparation described in U.S. Pat. No. 2,938,875 as well as in other prior sources have produced crude mixtures of unascertained isomers and the like containing principally the 1,2- and 1,3-isomers. Thus, it has not heretofore been possible to prepare pure, crystalline 1,5-diglycidylnaphthalene.

SUMMARY OF THE INVENTION

The present invention is directed to crystalline 1,5-diglycidylnaphthalene and to the preparation thereof. The present invention is further directed to cured compositions of crystalline 1,5-diglycidylnaphthalene with an epoxy curing agent, particularly amines and more particularly metaphenylenediamine.

It was discovered quite unexpectedly that when crystalline 1,5-diglycidylnaphthalene is cured with epoxy curing agents, the resulting cured products are polymers exhibiting a high Tg (i.e., glass transition temperature as indicated by rapid increase in vibrational damping of the specimen in a torsion pendulum test as the test temperature is increased) and excellent thermal stability. When the curing agent is metaphenylenediamine, the resulting product has outstandingly improved thermal stability over conventional epoxy resin systems or over mixed diglycidylnaphthalene isomers.

DESCRIPTION OF THE PREFERRED EMBODIMENT

Figure 1:
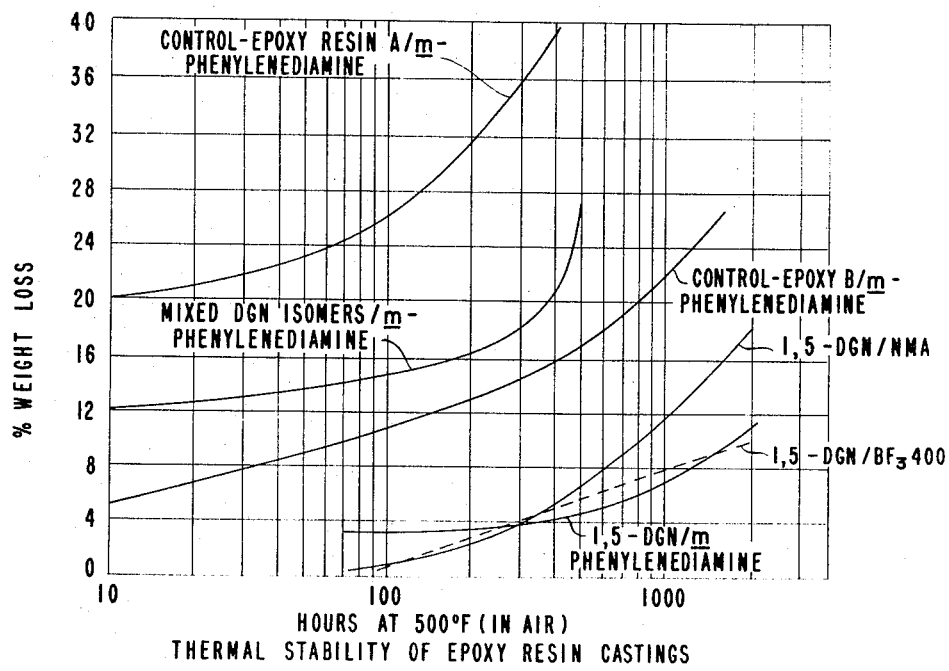
FIG. 1 is a graph of the thermal stability of epoxy resin castings cured with various epoxy curing agents measured by percent weight loss as a function of time at 500° F.

The present invention is particularly directed to crystalline 1,5-diglycidylnaphthalene and to the cured compositions thereof with epoxy curing agents, particularly metaphenylenediamine.

Briefly, 1,5-diglycidylnaphthalene is prepared in a straight-forward manner using known techniques, reactants, and reaction conditions. Diallylnaphthalene is first prepared by conventional methods wherein naphthalene is reacted with allyl chloride in the presence of Friedel-Crafts catalysts such as $FeCl_3$, $AlCl_3$ or $ZnCl_2$. The resulting product is, of course, a mixture of mono-, di- and tri-allylnaphthalenes. The allylnaphthalenes are then separated by conventional distillation techniques and further refined to give a fraction rich in the 1,5-isomer.

It will be appreciated that the allylic-substituted naphthalenes may be prepared by reacting disodium naphthalene with allyl chloride and that other methods for making the diallyl naphthalenes will be apparent to those skilled in the art.

The epoxidation of the allyl radicals attached to the naphthalene ring may be advantageously carried out by reacting the allylnaphthalene with an epoxidizing agent. Organic peracids, such as peracetic acid, perbenzoic acid, monoperphthalic acid and the like, are preferred agents for epoxidation.

The amount of the epoxidizing agent employed will vary over a considerable range; however, in general, one employs at least one mole of the epoxidizing agent to every ethylenic group to be epoxidized. Thus, to produce 1,5-diglycidylnaphthalene, one would react 1 mole of 1,5-diallylnaphthalene with approximately 2 moles of the epoxidizing agent.

It is preferred to carry out the epoxidation reaction in a suitable mutual solvent for the reactants and product. Chloroform is an especially useful solvent, but other solvents include ethyl ether, dichloroethane, benzene, ethyl acetate, and the like. It is not necessary to operate under anhydrous conditions, but the amount of water present should be limited so as to avoid excessive hydrolysis of the epoxy groups. Up to about 25 percent water may be tolerated in the reaction mixture.

The temperature employed during the epoxidation may vary over a considerable range depending upon the epoxidizing agent selected. It is generally desirable to maintain the temperature between −20° and 100° C., and more preferably between 10° and 60° C. Atmospheric, subatmospheric or superatmospheric pressures may be employed as desired.

The resulting 1,5-diglycidylnaphthalene may then be recovered from the reaction mixture by any means known in the art, such as distillation, extraction, filtration, fractional precipitation and the like as well as combinations of techniques.

1,5-digylcidylnaphthalene prepared as described herein is a crystalline solid having a melting point of 124° C. and a weight per epoxy (WPE) value essential equal to the theoretical value of 120.

Synthesis of Crystalline 1,5-diglycidylnaphthalene

A. Preparation of 1,5-diallylnaphthalene

The equipment consisted of a 5-liter, four-necked, round bottom, flask fitted with a stirrer, reflux condenser and thermometer.

The charge to the reaction flask was as follows:

| | Moles | Grams | ml. |
|---|---|---|---|
| Naphthalene | 4 | 512 | — |
| Allyl Chloride | 17.6 | 1,346 | — |
| Hexane | — | — | 1,440 |
| $CaCO_3$ | 8 | 800 | — |
| $FeCl_3$ | 0.2 | 32 | — |

The naphthalene, allyl chloride, hexane, and $CaCO_3$ were charged to the flask with stirring. The temperature dropped from ambient (25° C.) to 12° C. because of the negative heat of solution of naphthalene in allyl chloride. The $FeCl_3$ was then added with vigorous stirring whereupon the temperature rose from 12° to 25° C. in one-half hour. The temperature was then taken to reflux over a period of about three-quarters of an hour and vigorous reflux was maintained for an additional 4 hours. The reaction mixture was then slurried with filter aid and filtered through a Buchner funnel. The solids on the filter were washed with 3×250 ml. of hexane, and the combined filtrates washed successively with 2×1,000 ml. distilled water, 1×1,000 ml. 10 percent wt. aqueous $Na_2CO_3$, and finally 1×1,000 ml. distilled water, the organic phase always being the upper one.

The excess allyl chloride and hexane were stripped from the organic phase at atmospheric pressure, and unreacted naphthalene (285.4 grams, 48.5 percent wt.) to final conditions of 94° C. kettle temperature and 0.1 mm. Hg pressure. A midcut consisting of mixed mono- and di-allylnaphthalenes (269.8 grams, 46.0 percent wt.) was then taken to 190° C. and 0.1 mm. Hg pressure. Rejected bottoms amounted to 32.5 grams, or 5.5 percent wt. of the volatiles-free crude reaction mixture.

The midcut from the above distillation was then fractionated with a 20-plate Oldershaw distillation column and associated equipment. Using a 2/1 reflux ratio, and 0.1 mm. Hg pressure diallylnaphthalene cut was taken in the boiling range of 128°–143° C., vapor temperature, and amounted to 84.2 grams. Spectroscopic analysis indicated this particular cut contained greater than 50 percent of the 1,5-isomer.

B. Preparation of Crystalline 1,5-diglycidylnaphthalene

The equipment consisted of a 1-liter, four-necked, round-bottomed, flask fitted with a stirrer, reflux condenser, thermosmeter, and graduated dropping funnel. The flask was immersed in a thermostatically controller water bath.

The reaction mixture composition was as follows:

|  | Grams | Chemical Equivalents | Mls |
|---|---|---|---|
| Diallylnaphthalene Cut | 78 | 0.75 | 78 |
| $CHCL_3$ | 288 | — | 194 |
| 40.0% Peracetic Acid | 214 | 1.125 |  |
| $NaC_2H_3O_2 \cdot 3H_2O$ | 6 | 0.0437 | 202 |
| $H_2O$ | 12 | — |  |
| Total | 598 |  | 474 |

The diallylnaphthalene and $CHCl_3$ were charged to the flask, and equilibrated at 46° C. While this was taking place the $NaC_2H_3O_2 \cdot 3H_2O$ in the indicated amount of water was added to the 40 percent peracetic acid. This solution was then placed in the dropping funnel, and added to the reaction mixture over a period of 39 minutes, the temperature during this period being controlled to 50 ± 5° C., by the rate of addition, and by adjustment of the bath temperature. The temperature of the reaction mixture was then controlled at 50±1° C. for an additional 166 minutes.

After cooling to about 30° C., the reaction mixture was transferred to a separatory funnel and allowed to phase. The upper aqueous phase was removed, and discarded. The lower organic phase was washed with 2×350 ml. 10 percent wt. aqueous NaCl solution, 1×150 ml. 10 percent wt. aqueous $Na_2CO_3$ solution, and finally with 1×350 ml. 10 percent wt. aqueous NaCl solution.

The lower organic phase was then slurried with filter aid and anhydrous $Na_2SO_4$, and after 15 minutes was filtered through a Buchner funnel. Volatiles were stripped from the filtrate to terminal conditions of 110° C. and 80 mm. Hg pressure. The residual resin amounted to 72 grams and had WPE value of 151.

A portion of this product (20 grams) was dissolved in 100 ml. $CH_3OH$, and the solution allowed to stand in the refrigerator (5°-10° C.) overnight. 4.4 grams of crystals were recovered which after devolatilization had a melting point of 120°-122° C. and a WPE value of 122. After recrystallization from 40 volumes of $CH_3OH$, the melting point was 124° C., and the weight per epoxy was 121. The formula weight WPE value for a pure diglycidylnaphthalene is 120. The infrared scan and NMR spectrum corresponded to those of a 1,5-disubstituted naphthalene. A GPC scan showed only one component, the 1,5-diglycidylnaphthalene.

The reaction of naphthalene with allyl chloride as given above was repeated but in this case the midcut from the first distillation was not further refined. Spectroscopic analysis indicated that the material was a mixture of 1,2-, 1,4- and 1,5-diallylnaphthalene with the 1,5-isomer constituting of less than 50 percent.

This mixed diallylnaphthalene was epoxidized as before to the corresponding mixture of diglycidylnaphthalenes. The product had a WPE of 157, which is substantially the same as that of the corresponding liquid product discussed in the preceding section (prepared from a diallylnaphthalene cut rich in the 1,5-isomer). It was not possible to induce crystallization in the mixed diglycidylnaphthalene isomers.

The crystalline 1,5-diglycidylnaphthalene may be cured through the epoxy groups to form valuable polymeric products having outstanding physical properties, particularly thermal stability. The crystalline 1,5-diglycidylnaphthalene may be polymerized alone or with other polyepoxide material in a variety of different proportions, such as, for example, with amounts of other epoxides varying from 5 percent to 95 percent by weight.

Crystalline 1,5-diglycidylnaphthalene can be cured with conventional epoxy resins curing agents such as acids, acid anhydrides, amines, polyamines, Friedel-Crafts compounds, Lewis acids, imidazoles compounds and salts, and the like to form hard, insoluble, infusible products having excellent high temperature properties.

Curing agents that can be utilized include, among others, amines, amino-containing polymers, polybasic acids, acid anhydrides, salts, mercaptans, hydrazines, $BF_3$-complexes, and the like, and mixtures thereof. Specific examples of such materials include, among others, p-phenylene diamine, diaminodiphenylsulfone, p,p-methylene dianiline, p,p-diaminophenylmethane, triaminobenzene, 2,4-diaminotoluene, tetraaminobenzene, 3,3-diamino diphenyl, 1,3-diamino-4-isopropylbenzene, 1,3-diamino-4,5-diethylbenzene, diaminostilbene, triethylamine, ethylene diamine, diethylamine, diethylene triamine, triethylene tetramine, tetraethylene pentamine, pyridine, diaminopyridine, piperidine, N,N-diethyl-1,3-propanediamine, dicyandiamide, melamine, fatty acid salts of amines, such as the 2-ethylhexoate of tris (dimethylaminomethyl) phenol adducts of polyepoxides such as those described hereinafter, and the above-described mono- and polyamines, as the adduct of p-phenylene diamine and styrene oxide, the adduct of p-phenylene diamine and allyl glycidyl ether, the adduct of diglycidylether of 2,2-bis(4-hydroxyphenyl)propane and diethylene triamine, the adducts of diethylene triamine and ethylene oxide, the adduct of diethylene triamine and styrene oxide, the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Pat. No. 2,450,940 and the monomeric amides described in U.S. Pat. No. 2,832,799.

Other examples include the acid anhydrides such as phthalic anhydride, succinic anhydride, dodecenylsuccinic anhydride, maleic anhydride, tetrahydrophthalic anhydride, pyromellitic anhydride, hexachlorophthalic anhydride, Nadic anhydride [endo-cis-bicyclo(2.2.1)-5-heptene-2,3-heptene-2,3-dicarboxylic anhydride], methyl Nadic anhydride [methylbicyclo (2.2.1)-heptene-2,3-dicarboxylic anhydride], anhydrides obtained by reacting maleic anhydride with unsaturated compounds, such as oils, terpinene, long chain unsaturated acids and the like as well as anhydrides obtained by reacting long chain acids with acetic anhydride and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium nitrate, magnesium phosphate, stannic fluoborate, zinc nitrate, and the like, as well as the chloride and the like.

Still other examples include the $BF_3$ adducts and complexes with various materials, such as amines, amides, ethers, phenols, alcohols, water and the like. Very suitable $BF_3$ adducts are the $BF_3$ etherates such as BF 3 ethylamine complex, $BF_3$ phenolates, $BF_3$-hydrates and $BF_3$ alcoholates.

Other catalysts include 3-aminopyridine and the imidazole compounds and their salts, such as, for example, 2-methyl-4-ethyl imidazole, imidazole, benzimidazole, imidazole lactate, imidazole acetate, imidazole tartrate, imidazole phthalate and the like.

The amount of the curing agents employed will also vary over a wide range. The amount of the curing agents having active hydrogen as well as the agents such as acid anhydrides are preferably employed so as to furnish at least 0.6 equivalents and still more preferably 0.8 to 1.5 equivalent per equivalent of the polyepoxide. As used herein in relation to the amount of curing agent, "equivalent" means that amount needed to furnish one active hydrogen or anhydride group per epoxy group. The other curing agents, such as metal salts, tertiary amines, $BF_3$, and the like are preferably used in amounts varying from about 0.1 percent to 6 percent by weight of the 1,5-diglycidylnaphthalene.

Particularly outstanding cured products having excellent high temperature properties are prepared when the curing agent is metaphenylenediamine.

It has been found that compositions of crystalline 1,5-diglycidylnaphthalene and metaphenylenediamine exhibit a thermal stability greater than theretofore known for epoxy compositions and are therefore extremely valuable for high temperature metal to metal adhesives. It has further unexpectedly been found that the 1,5-isomer has a thermal stability much greater than that of the mixed isomers.

The following examples are presented in order to illustrate the cured compositions of the present invention. Unless otherwise specified parts are given by weight.

EXAMPLE I

This example illustrates the improved elevated temperature properties of 1,5-diglycidylnaphthalene (1,5-DGN) cured with metaphenylenediamine over conventional epoxy resins or the mixed isomer of DGN.

The stoichometric amount of molten metaphenylenediamine was dissolved in (1) molten 1,5-DGN, (2) mixed isomers of DGN, (3) Epoxy Resin A [a glycidyl polyether of 2,2-bis(4-hydroxyphenyl)propane having an average molecular weight of approximately 360 and an epoxide equivalent weight of 188], and (4) Epoxy Resin B [a glycidyl ether of a phenol-novolac resin]. Rod coatings one-eighth inch diameter by four inch long were made using a cure cycle of 1 hour at 100° C. plus 1 hour at 200° C. The glass transition temperature (Tg) of these castings was determined (via torsion pendulum damping versus test temperature) to be as follows:

| Resin Property | Epoxy Resin A | Epoxy Resin B | Mixed Isomers of DGN | 1,5 -DGN |
| --- | --- | --- | --- | --- |
| WPE (weight per epoxide) | 188 | 177 | 157 | 120 |
| Molecule Weight | 360 | 620 | 300 | 240 |
| Epoxies per Mole | 1.9 | 3.5 | 1.9 | 2.0 |
| Tg, °C., of Cured Casting | 165 | 240 | 205 | 250 |

As can be seen, the 1,5-DGN has the highest glass transition temperature despite the fact that it has neither the highest functionality per mole nor, as can be calculated, the shortest distance between cross-links, i.e., the greatest cross-link density.

EXAMPLE II

This example illustrates the improved thermal stability of 1,5-diglycidylnaphthalene over the mixed isomers of diglycidylnaphthalene and over conventional epoxy resins.

The stoichometric amount of molten metaphenylenediamine was dissolved in (1) molten 1,5-diglycidylnaphthalene (1,5-DGN), (2) mixed isomers of diglycidylnaphthalene, (3) Epoxy Resin A, and (4) Epoxy Resin B. Small discs were cast of each system, allowed to gel overnight at room temperature, and cured for 4 hours at 100° C. plus 4 hours at 200° C. Similar castings were made with 1,5-DGN cured with (1) the stoichometric amount of Nadic methyl anhydride (NMA) plus 0.2 percent wt. (of total) of benzyldimethylamine, and (2) 2 percent boron trifluoride ethylamine complex (BF$_3$-400). These two castings were also cured for 4 hours at 100° C. plus 4 hours at 200° C.

All of the above castings were weighed and placed in a forced draft oven operating at 500° F. At appropriate intervals the casings were removed from the oven, cooled, weighed and returned to the oven. The resulting data are graphically presented in FIG. 1 and clearly show the superior thermal stability of 1,5-DGN.

EXAMPLE III

This example further illustrates the thermal stability of 1,5-DGN.

A torsion pendulum rod of 1,5-DGN cured with metaphenylenediamine was prepared as in example I and subjected to exposure in a forced draft oven at 500° F. At appropriate intervals the specimen was removed and the shear modulus and damping factor determined over the temperature range of 23°–240b$L$ C.

Figure 3:
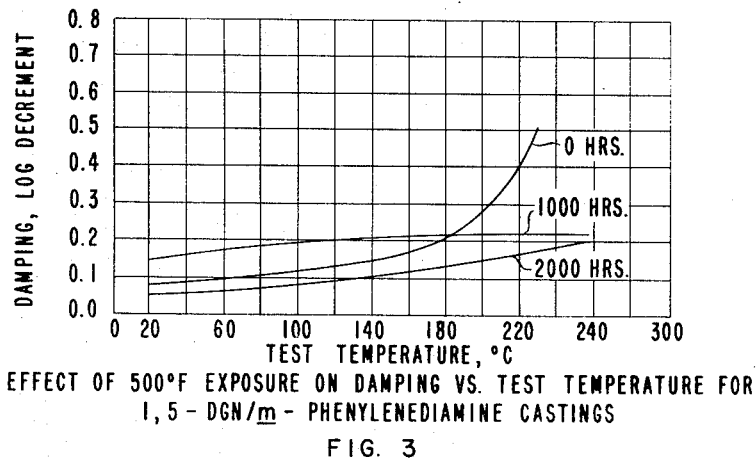
FIG. 3 is a graph of the effect of heat exposure on damping characteristics of the 1,5-DGN/metaphenylenediamine castings.
Figure 2:
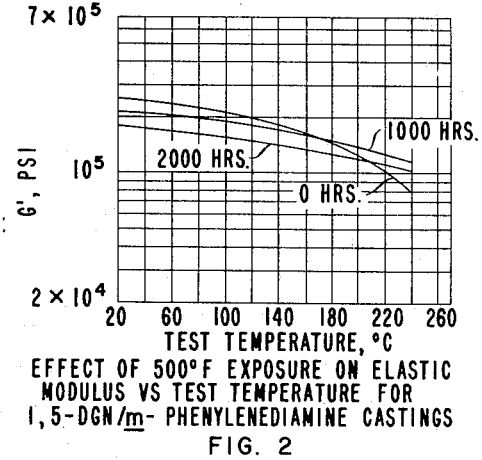
FIG. 2 is a graph of the effect of high-temperature exposure on elastic modulus versus test temperature for 1,5-diglycidylnaphthalene/m-phenylenediamine castings.

The shear modulus characteristics of the m-phenylenediamine-cured castings were analyzed via torsion pendulum tests at several intervals during the 500° F. exposure. FIGS. 2 and 3 present the data obtained after three exposure times, viz, zero, 1,000, and 2,000 hours (intermediate data has been omitted to simplify the figures). FIG. 2 gives the variation of the elastic component, $G'$, of the complex shear modulus with temperature. The difference between the three curves, while considered experimentally valid, are small; perhaps of greater significance is the absence of signs of embrittlement (increase of room temperature modulus) during exposure.

FIG. 3 shows the effect of exposure on the damping characteristics (a measure of the plastic component of the complex shear modulus) of the system. Of significance here is the shift of the damping peak, indicative of the second order transition temperature, from about 250° C. initially to a temperature considerably beyond 260° C. Also of significance is the generally low level of damping, indicating a predominantly elastic material.

For a predominantly elastic material Young's modulus can be calculated from torsion pendulum data by the equation $$E = 2G'(1+\mu)$$

By assuming a Poissons Ratio ($\mu$) of 0.35, a typical value of a glassy polymer the data of FIG. 2 can be conveniently recast to show the effect of 500° F. exposure on the Young's modulus at room temperature and 200° C.

We claim as our invention:

1. A cured composition exhibiting high glass transition temperatures and high thermal stability comprising the reaction product of crystalline 1,5-diglycidylnaphthalene and a curing amount of an epoxy curing agent.

2. A composition as in claim 1 wherein the epoxy curing agent is employed in an approximately stoichiometrical amount.

3. A composition as in claim 1 wherein the epoxy curing agent is an amine.

4. A composition as in claim 3 wherein the amine is metaphenylenediamine.

5. A composition as in claim 1 wherein the epoxy curing agent is an acid anhydride.

6. A composition as in claim 5 wherein the anhydride is methyl [2.2.1] heptene-2,3-dicarboxylic anhydride.

7. A composition as in claim 1 wherein the epoxy curing agent is a Lewis acid.

8. A composition as in claim 7 wherein the Lewis acid is a BF$_3$ complex.

* * * * *